United States Patent
Mann et al.

(10) Patent No.: US 12,370,600 B2
(45) Date of Patent: Jul. 29, 2025

(54) COMPOSITE MANUFACTURING METHODS USING METAL-POLYMER AMALGAMATIONS

(71) Applicant: M4 SCIENCES, LLC, Lafayette, IN (US)

(72) Inventors: James B Mann, Pensacola Beach, FL (US); Brian J. Arnold, Pensacola, FL (US); Brian D. Gootee, Martinsville, IN (US)

(73) Assignee: M4 Sciences, LLC, Lafayette, IN (US)

( * ) Notice: Subject to any disclaimer, the term of this patent is extended or adjusted under 35 U.S.C. 154(b) by 0 days.

(21) Appl. No.: 17/734,097

(22) Filed: May 1, 2022

(65) Prior Publication Data

US 2023/0219135 A1 Jul. 13, 2023

Related U.S. Application Data

(60) Provisional application No. 63/297,721, filed on Jan. 8, 2022.

(51) Int. Cl.
| | | |
|---|---|---|
| *B22F 9/04* | (2006.01) | |
| *B29C 64/118* | (2017.01) | |
| *B29C 64/314* | (2017.01) | |
| *B29K 505/00* | (2006.01) | |
| *B33Y 10/00* | (2015.01) | |
| *B33Y 40/10* | (2020.01) | |
| *B33Y 70/10* | (2020.01) | |

(52) U.S. Cl.
CPC .............. *B22F 9/04* (2013.01); *B29C 64/118* (2017.08); *B29C 64/314* (2017.08); *B33Y 10/00* (2014.12); *B33Y 40/10* (2020.01); *B33Y 70/10* (2020.01); *B22F 2009/046* (2013.01); *B29K 2505/00* (2013.01)

(58) Field of Classification Search
None
See application file for complete search history.

(56) References Cited

U.S. PATENT DOCUMENTS

| | | | | |
|---|---|---|---|---|
| 2,636,819 | A * | 4/1953 | Streicher | C22C 5/00 420/466 |
| 3,926,691 | A * | 12/1975 | Fustukian | B22F 3/24 148/426 |
| 5,260,380 | A * | 11/1993 | Isayev | C08L 101/00 525/391 |
| 5,352,266 | A | 10/1994 | Erb et al. | |
| 7,294,165 | B2 | 11/2007 | Chandrasekar et al. | |

(Continued)

FOREIGN PATENT DOCUMENTS

| | | | | |
|---|---|---|---|---|
| CN | 1459348 A | * | 12/2003 | ........... B29C 47/707 |
| WO | WO-2011019408 A1 | * | 2/2011 | ........... B29C 47/707 |

OTHER PUBLICATIONS

CN-1459348-A translation (Year: 2023).*

(Continued)

*Primary Examiner* — Xiao S Zhao
*Assistant Examiner* — Guy F Mongelli
(74) *Attorney, Agent, or Firm* — Indiano Law Group LLC; E. Victor Indiano; John T. Woods, III

(57) ABSTRACT

A composite material includes a plurality of metallic particles formed through modulation-assisted machining. The composite includes a thermoplastic polymer matrix which binds the plurality of metallic particles.

18 Claims, 10 Drawing Sheets

(56) References Cited

U.S. PATENT DOCUMENTS

| | | | |
|---|---|---|---|
| 7,587,965 B2 | 9/2009 | Mann et al. | |
| 7,617,750 B2 | 11/2009 | Moscoso et al. | |
| 7,628,099 B2 | 12/2009 | Mann et al. | |
| 7,691,305 B2 | 4/2010 | Sutton et al. | |
| 7,895,872 B2 | 3/2011 | Mann et al. | |
| 8,043,655 B2 | 10/2011 | Miller et al. | |
| 8,694,133 B2 | 4/2014 | Mann et al. | |
| 9,187,809 B2 | 11/2015 | Keane et al. | |
| 2002/0062909 A1* | 5/2002 | Jang | B33Y 10/00 156/307.3 |
| 2003/0074096 A1* | 4/2003 | Das | B29C 64/153 700/119 |
| 2006/0243107 A1* | 11/2006 | Mann | B23B 29/125 408/1 R |
| 2007/0269648 A1* | 11/2007 | Schuh | C25D 3/56 428/323 |
| 2010/0305269 A1* | 12/2010 | Gleich | B29C 70/32 422/138 |
| 2010/0330144 A1* | 12/2010 | Liu | B05B 13/0442 428/36.1 |
| 2012/0258250 A1* | 10/2012 | Rodgers | B33Y 10/00 427/402 |
| 2012/0271396 A1* | 10/2012 | Zheng | A61L 31/14 623/1.2 |
| 2015/0080495 A1* | 3/2015 | Heikkila | B29C 64/106 264/642 |
| 2015/0321418 A1* | 11/2015 | Sterman | B29C 64/393 264/210.1 |
| 2016/0122570 A1* | 5/2016 | Chae | C09D 123/14 524/582 |
| 2016/0303793 A1* | 10/2016 | Ermoshkin | B29C 64/129 |
| 2019/0299282 A1* | 10/2019 | Licitar | C30B 35/007 |
| 2019/0308245 A1 | 10/2019 | Barnes et al. | |
| 2020/0399136 A1* | 12/2020 | Anthonis | C01B 37/02 |
| 2021/0146442 A1 | 5/2021 | Barnes et al. | |

OTHER PUBLICATIONS

Koumoulos EP, Trompeta AF, Santos RM, Martins M, Santos CM, Iglesias V, et al. Research and development in carbon fibers and advanced high-performance composites supply chain in Europe: a roadmap for challenges and the industrial uptake. J Compos Sci 2019;3(3):86.

Chen C, Xue Y, Li X, Wen Y, Liu J, Xue Z, et al. High-performance epoxy/binary spherical alumina composite as underfill material for electronic packaging. Compos A Appl Sci Manuf 2019; 118:67-74.

Chauhan V, Karki T, Varis J. Review of natural fiber-reinforced engineering plastic composites, their applications in the transportation sector and processing techniques. J Thermoplast Compos Mater 2022;35(8):1169-209.

Mohanty AK, Vivekanandhan S, Pin JM, Misra M. Composites from renewable and sustainable resources: Challenges and innovations. Science 2018;362(6414): 536-42.

Ji A, Zhang S, Bhagia S, Yoo CG, Ragauskas AJ. 3D printing of biomass-derived composites: application and characterization approaches. RSC Adv 2020; 10(37): 21698-723.

Goh GD, Neo SJ, Dikshit V, Yeong WY. Quasi-static indentation and sound-absorbing properties of 3D printed sandwich core panels. J Sandw Struct Mater 2022;24(2):1206-25.

Park CH, Lee WI, Yoo YE, Kim EG. A study on fiber orientation in the compression molding of fiber reinforced polymer composite material. J Mater Process Technol 2001;111(1-3):233-9.

Jaafar J, Siregar JP, Tezara C, Hamdan MH, Rihayat T. A review of important considerations in the compression molding process of short natural fiber composites. Int J Adv Manuf Technol 2019;105(7):3437-50.

Rouison D, Sain M, Couturier M. Resin transfer molding of hemp fiber composites: optimization of the process and mechanical properties of the materials. Compos Sci Technol 2006;66(7-8):895-906.

Dickson AN, Barry JN, McDonnell KA, Dowling DP. Fabrication of continuous carbon, glass and Kevlar fibre reinforced polymer composites using additive manufacturing. Addit Manuf 2017;16:146-52.

Zhao J, Li Q, Jin F, He N. Digital light processing 3D printing Kevlar composites based on dual curing resin. Addit Manuf 2021;41:101962.

Ligon SC, Liska R, Stampfl J, Gurr M, Mulhaupt R. Polymers for 3D printing and customized additive manufacturing. Chem Rev 2017;117(15):10212-90.

Mann JB, Guo Y, Saldana C, Compton WD, Chandrasekar S. Enhancing material removal processes using modulation-assisted machining. Tribol Int 2011;44(10):1225-35.

Mann JB, Saldana C, Chandrasekar S, Compton WD, Trumble KP. Metal particulate production by modulation-assisted machining. Scr Mater 2007;57(10):909-12.

Uluca Y, Shankar MR, Mann JB, Rao BC, Chandrasekar S, Compton WD. Nanocrystalline materials from aerospace machining chips. Soc Automotive Eng (SAE) Trans-J Aerospace 2005;01:3306.

Saldana C, Swaminathan S, Brown TL, Moscoso W, Mann JB, Compton WD, et al. Unusual applications of machining: controlled nanostructuring of materials and surfaces. J Manuf Sci Eng Jun. 2010;132(3):030908.

Brown TL, Saldana C, Murthy TG, Mann JB, Guo Y, Allard LF, et al. A study of the interactive effects of strain, strain rate and temperature in severe plastic deformation of copper. Acta Mater 2009;57(18):5491-500.

Issahaq MN, Chandrasekar S, Trumble KP. Single-Step Shear-Based Deformation Processing of Electrical Conductor Wires. J Manuf Sci Eng 2021;143(5).

Sagapuram D, Udupa A, Viswanathan K, Mann JB, M'Saoubi R, Sugihara T, et al. On the cutting of metals: a mechanics viewpoint. J Manuf Sci Eng 2020;142(11).

Dieter GE. Mechanical Metallurgy. 2nd ed. New York: McGraw-Hill; 1976.

Standard ASTM D790-17. Standard test methods for flexural properties of unreinforced and reinforced plastics and electrical insulating materials. American Society of Testing Materials. 2017.

Zhang GD, Chen R. Effect of the interfacial bonding strength on the mechanical properties of metal matrix composites. Compos Interfaces 1993;1(4):337-55.

Wu Y, Li C, Chen T, Qiu R, Liu W. Photo-curing 3D printing of micro-scale bamboo fibers reinforced palm oil-based thermosets composites. Compos A Appl Sci Manuf 2022;152:106676.

Valadez-Gonzalez A, Cervantes-Uc JM, Olayo RJ, Herrera-Franco PJ. Effect of fiber surface treatment on the fiber-matrix bond strength of natural fiber reinforced composites. Compos B Eng 1999;30(3):309-20.

Song W, Gu A, Liang G, Yuan L. Effect of the surface roughness on interfacial properties of carbon fibers reinforced epoxy resin composites. Appl Surf Sci. 2015; 257(9): 4069-74.

Anderson TL. Fracture mechanics: fundamentals and applications. 4th ed. CRC Press; 2017.

Talreja R, Singh C. Damage and Failure of Composite Materials. Cambridge: Cambridge University Press; 2012.

Hu X, Wang L, Xu F, Xiao T, Zhang Z. In situ observations of fractures in short carbon fiber/epoxy composites. Carbon 2014;67:368-76.

Bell JP. Flow orientation of short fiber composites. J Compos Mater 1969;3(2): 244-53.

Bay RS, Tucker III CL. Fiber orientation in simple injection moldings. Part I: Theory and numerical methods. Polym Compos 1992; 13(4):317-31.

Bay RS, Tucker III CL. Fiber orientation in simple injection moldings. Part II: Experimental results. Polym Compos 1992;13(4):332-41.

Dilley NR, Black RC, Montes L, Wilson A, Simmonds MB. Commercial apparatus for measuring thermal transport properties from 1.9 to 390 Kelvin. MRS Online Proceedings Library (OPL) 2001;691.

Ngo IL, Byon C. Thermal conductivity of particle-filled polymers. Polym Sci Book Ser 2016;1:554-65.

(56) References Cited

OTHER PUBLICATIONS

Tillmann W, Elrefaey A, Wojarski L. Toward process optimization in laser welding of metal to polymer. Mater Sci Eng Technol. 2010; 41(10): 879-83.
Kortschot MT, Woodhams RT. Computer simulation of the electrical conductivity of polymer composites containing metallic fillers. Polym Compos 1988;9(1):60-71.

* cited by examiner

COMPOSITE MANUFACTURING METHODS USING METAL-POLYMER AMALGAMATIONS

CROSS-REFERENCE TO RELATED APPLICATIONS

This application claims the benefit of U.S. Provisional Patent Application No. 63/297,721, filed Jan. 8, 2022, which is incorporated by reference herein in its entirety. The disclosure of U.S. Provisional Application No. 63/135,718, filed Jan. 10, 2021, is incorporated by reference herein in its entirety.

TECHNICAL FIELD

The present application generally relates to composites and more particularly, but not exclusively, to composite materials and methods of manufacturing composite materials.

BACKGROUND

A composite material is a material which is produced from two or more constituent materials. These constituent materials have notably dissimilar chemical or physical properties and are merged to create a material with properties unlike the individual constituent materials. Within the finished structure, the individual elements remain separate and distinct, which distinguishes a composite material from a mixture and a solid solution.

A well-known and long-used composite material is reinforced concrete. Reinforced concrete usually contains a cement carrier (often referred to as the "matrix") into which are placed dissimilar materials such as aggregates, steel reinforcing bars, fillers, fibers, and/or additives. The aggregates usually consist of a stone or gravel material.

The aggregates, fillers, fibers, and steel bars serve as reinforcing materials, and can alter the properties of the concrete (e.g., increased strength, increased ductility should a sufficient amount of nylon fibers be included, etc.).

Reinforced polymers are another class of composite materials. One example of a reinforced polymer is a fiber-reinforced plastic, such as fiberglass. Fiberglass includes a polymer matrix reinforced by glass fibers. Another reinforced polymer composite material is a carbon fiber-reinforced polymer. Additional reinforcing materials can include things such as aramid (Kevlar® and Nomex®) or basalt. Further, particles (typically in powder or fiber forms) such as metal, paper, wood, ceramic, or asbestos have been used as reinforcing materials.

Polymer matrixes can be epoxy, vinyl ester, or polyester thermosetting resin. Additionally, phenol formaldehyde resins are utilized in some applications as are thermoplastics.

Ceramic matrix composites consist of ceramic whiskers (e.g., fibers) embedded in a metal or ceramic matrix. Ceramic composites can additionally and/or alternatively include metal as the reinforcing fiber.

Metal matrix composites consist of metal fibers embedded in a metal matrix. Typically, the metal matrix material is of a material having a lower melting point relative the reinforcement powder or fiber constituent.

As will be appreciated, the characteristics of the composite can vary significantly, depending upon the matrix carrier and the particular reinforcement utilized (e.g., powder, fiber) selected. When creating a composite, it is necessary to determine the desired ratio of particles (e.g., fibers, spheres, etc.) to matrix material to achieve the characteristics desired.

Another facet of composite selection is to select a matrix carrier and reinforcement that is capable of being manufactured in a particular way. For example, thermosetting polymers are often not well-suited to for manufacture by 3-D printing and some molding processes. Rather, thermoplastic matrix materials are preferred for 3-D printing applications.

A wide variety of types of composites are currently manufactured. Generally, a composite includes two or more distinct constituents, including the matrix and the reinforcement (e.g., the filler). In some composites, multiple different fillers can be utilized. For example, one could have a matrix made of a polymer with a first carbon material filler particulate and a second metal filler particulate.

Often the carrier material (e.g., the polymer, epoxy, or ceramic) in which the metal particles is referred to as a matrix. The constituents that are placed into the matrix are typically referred to as fillers, additives, reinforcers, or fibers, depending upon the particular role which the particular constituent serves within the composite material.

Presently, metal particles are utilized as fillers in a number of composite materials. There are many drawbacks to metallic filler composites of the prior art. One problem is the limited selection of metals currently commercially available for use with such composites. Typically, these metals are of a limited number of alloys and are sold in a powdered form. The most common metal powder currently available is iron (Fe) powder; however, other base metals and alloys have become available, including aluminum, nickel, copper, and various steels.

There are numerous drawbacks to utilizing powdered metals. Not only are there safety hazards associated with the use of powdered metals (e.g., necessary precautions must be followed to prevent inhalation risk), but there are also many problems associated with the storage of powdered metals (e.g., corrosion and risk of combustion for some metallic particles). Powdered metals can be prohibitively expensive for many manufacturing processes.

Some processes use metallic wire instead of powdered metals. In these processes, the metal constituent is made by starting with a drawn wire, and then chopping the wire into smaller length particles. However, drawn wire processes include constraints that relate to the size to which the metal particles can be cut and sized. There is also a limit as to how small the wire diameter can be. In addition, some metals and alloys are extremely difficult to draw into small cross sections, further limiting the availability of small length particles.

Interest in machine shavings (e.g., metal chips produced from cutting operations such as turning, milling, and drilling), as can be obtained from machine shops, has increased in recent years. Although machine shavings are plentiful and are typically inexpensive (e.g., as they are usually considered to be a scrap material), the use of machine shavings in composites has numerous disadvantages. For example, machine shavings are often contaminated by oil-based lubricant, commonly referred to as cutting fluid.

Additionally, machine shavings are too large for many composite applications. Use of such machine shavings includes the requirement of a secondary process to cut/chop the shavings to a smaller size. Moreover, machine shavings typically include inconsistent, uncontrollable sizes and microstructures, especially after a secondary cutting/sizing process has been performed thereon.

One difficulty with current metallic fiber composite materials is that it is difficult to control the size, shape, composition, and microstructure of the metallic fiber material utilized. Use of such particles results in a composite material with undesirable variability, which often does not meet the desired parameters for the composite.

There are also cases where it is desirable to have metallic reinforcing particles that include a first set of size, shape, composition, and microstructure parameters, along with a second set of metallic reinforcing materials that have different size, shape, composition, and microstructure parameters. Present processes and available metallic fibers/fillers often prevent such composites from being produced.

The inability to provide metallic reinforcing particles having a predetermined size, shape, composition, and/or microstructure makes it difficult to create a composite having set desired characteristics.

Moreover, even if a desired microstructure is achieved in metallic reinforcing particles produced from machine shavings or some other method, the microstructure is typically lost during typical consolidation processing. For example, in direct metal laser sintering (DMLS), a metal layer can be printed which is then heated via a laser, which bonds the metallic reinforcing particles together. After the first layer is deposited, another layer of metal is deposited on top of the first layer with a laser then heating the second layer to bond it to the first layer and bonding the metal particles to each other. This process is subsequently repeated to build up the 3-D shape of the component in a layer-by-layer sequence. DMLS subjects the metallic reinforcing particles to temperatures which are high enough to alter the microstructure of the metallic reinforcing particles. Additionally, objects which are produced through DMLS typically include voids (e.g., are not substantially solid) which can significantly weaken the formed component.

Other known powdered metallurgical forming processes utilize sintering processes to heat the metallic particles to a sufficient temperature such that the metallic particles are joined. The microstructure of these metallic particles is altered during such sintering operations due to the temperatures involved.

Therefore, further technological developments are desirable in this area.

SUMMARY

One form of the present application includes a method for forming a composite. This method includes providing a plurality of metallic particles formed through modulation-assisted machining. The method further includes providing a polymer. The metallic particles are mixed with the polymer. The polymer is heated to a first temperature, and the first temperature is at least as high as a glass transition temperature of the polymer. The method further includes extruding a heated amalgamation of the metallic particles and the polymer to form a composite having the metallic particles adhered with a polymer matrix.

The plurality of metallic particles can each include a textured surface that enhances the adhesion of the metallic particles and the polymer matrix. The plurality of metallic particles can be selected from the group consisting of fiber particles, platelet particles, and equiaxed particles.

The modulation-assisted machining can impart a nano-crystalline microstructure into the plurality of metallic particles. The first temperature can be lower than a grain growth temperature threshold of the metallic particles so that the metallic particles retain the nano-crystalline microstructure through the heating. The first temperature can be lower than a critical recrystallization temperature threshold of the metallic particles.

The modulation-assisted machining can impart a nano-crystalline microstructure into the plurality of metallic particles. The first temperature can exceed a grain growth temperature threshold of the metallic particles so that an internal structure of the metallic particles is transformed from the nano-crystalline microstructure into a microcrystalline structure.

Providing the polymer can include providing thermoplastic polymer pellets. Mixing the metallic particles with the polymer can include mixing the thermoplastic polymer pellets and the metallic particles prior to heating the thermoplastic polymer.

The method can include the step of reheating the composite for further processing. The further processing can be selected from the group consisting of additive manufacturing, thermoforming, and injection molding.

The method can further include generating the metallic particles through modulation-assisted machining. The metallic particles can be machined from at least one of the following metals and alloys: aluminum, copper, titanium, nickel, magnesium, lithium, platinum, platinum, scandium, tungsten, molybdenum, niobium, tantalum, rhenium, palladium, and steel.

Providing the plurality of metallic particles can include providing a plurality of metallic fibers. Each metallic fiber can include a length ranging between 0.1 mm and 10.0 mm and each metallic fiber can include an effective diameter ranging between 0.01 mm and 0.25 mm.

Another form of the present application is directed to a composite material. This composite material includes a plurality of metallic particles formed through modulation-assisted machining. This composite material also includes a thermoplastic polymer matrix. The plurality of metallic particles is bound together by the thermoplastic polymer matrix.

Each of the plurality of metallic particles can include a textured surface. The plurality of metallic particles can be selected from the group consisting of fiber particles, platelet particles, and equiaxed particles.

The plurality of metallic particles can include metallic fibers. Each metallic fiber can include a length ranging between 0.1 mm and 10.0 mm and each metallic fiber can include an effective diameter ranging between 0.01 mm and 0.25 mm.

The plurality of metallic particles can include a nano-crystalline microstructure. The composite can be formed through additive manufacturing. The composite material can be a brake pad or a skateboard wheel.

The composite material can be a feedstock configured for further processing. The further processing can be selected from the group consisting of additive manufacturing, thermoforming, and injection molding.

Yet another form of the present application is directed to a method for forming a composite through fused deposition modeling. This method includes providing metallic particles that were generated through modulation-assisted machining. The method includes heating a polymer to a first temperature which is at least as high as a glass transition temperature of the polymer. The method further includes forming a composite through extruding a heated mixture including the metallic particles and the polymer through a printer nozzle.

The metallic particles can include a textured surface. The metallic particles can be selected from the group consisting of fiber particles, platelet particles, and equiaxed particles.

The modulation-assisted machining can impart a nano-crystalline microstructure into the plurality of metallic particles. The first temperature can be lower than a grain growth temperature threshold of the metallic particles so that the nano-crystalline microstructure is retained.

Providing metallic particles can further include providing metallic fibers in a composite feedstock. Heating the polymer can include heating the composite feedstock. The method can further include directing the printer nozzle along a preset printing path to obtain a predetermined orientation of the metallic fibers.

Other embodiments and forms described herein include unique composite apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
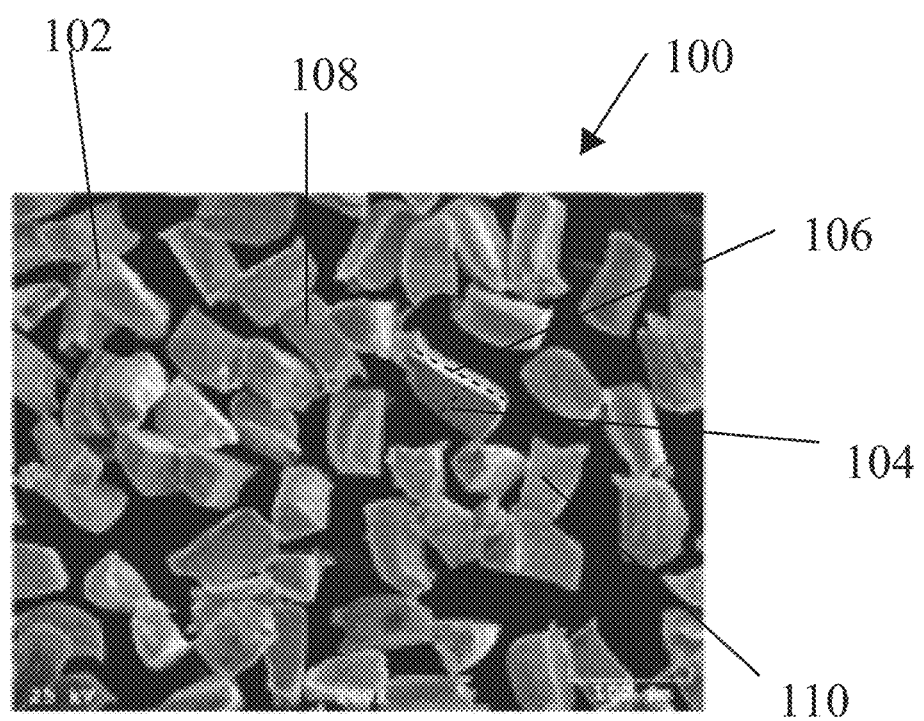
FIGS. 1, 1A, and 1B are photographic depictions of metallic particles formed through modulation-assisted machining, the metallic particles having an equiaxed configuration, as viewed from a scanning electron microscope.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

The present application is directed toward composites, and methods and processes of manufacturing composites. The composites of the present application include metallic particles and a polymer matrix. The metallic particles of the present application are generated through a modulation-assisted machining process. Modulation-assisted machining is described in at least: U.S. Pat. No. 8,694,133 to Mann et al.; U.S. Pat. No. 7,895,872 to Mann et al.; U.S. Pat. No. 7,628,099 to Mann et al.; U.S. Pat. No. 7,617,750 to Moscoso et al.; and U.S. Pat. No. 7,587,965 to Mann et al., the disclosures of which are all expressly incorporated by reference herein.

Modulation-assisted machining typically involves a machining apparatus which includes a driver which drives a cutting tool. The cutting tool contacts a bar or billet of feedstock (e.g., a workpiece) and cuts the feedstock to produce the particles. The driver typically controls a linear actuator which provides for the cutting tool to be repeatedly engaged and separated from the workpiece. The workpiece (e.g., feedstock) or cutting tool can also rotated during modulation-assisted machining.

The manner in which the driver operates the cutting tool is controlled by a controller. Such controllers are typically capable of receiving and/or determining a wide variety of different parameters and the outputs from these parameters control the operation of the cutting tool and impact the size and morphology of the particles produced. These parameters can include, but are not limited to, such things as rotational speed, frequency (e.g., the number of times that a cutting tool would engage the feedstock in a given time period), and amplitude (e.g., how deep the cutting tool engages the feedstock).

The operating parameters of modulation-assisted machining can be varied to achieve a desired particulate. For example, the frequency and amplitude at which the device is operated may be altered in addition to typical machining parameters such as the speed at which the tool engages the feedstock, the depth to which the tool engages the feedstock, and the rate at which the tool engages the feedstock.

Metallic particles produced through modulation-assisted machining have a narrow range of size distribution. These particles also have a controllable range of morphologies and a unique microstructure which is imparted during modulation-assisted machining. The metallic particles manufactured by modulation-assisted machining are generally smaller, and have a much narrower size distribution, than metal particles presently produced through other known processes which may currently be utilized in composites.

Metallic particles produced through modulation-assisted machining can include a cross-sectional size distribution ranging between 20 μm and 100 μm and can include a length distribution ranging between 20 μm and 20 mm, depending upon the operating parameters selected. By varying the operating parameters of the machining operation (e.g., via the controller) a user can select the size of particles to be produced.

It has been discovered that in many composite applications a smaller particle size can be advantageous as the particles can be better dispersed through the composite. Additionally, the smaller size and narrow particle sizing distribution can allow the particles to be better suited for use in additive manufacturing as the smaller size particles can better fit through a nozzle of, for example, an additive printing machine. By producing particles having a greater consistency the potential exists for increasing reproducibility between parts and the potential exists to better control the parameters of the final product. Modulation-assisted machining can provide greater consistency as the operator has better control over the size, shape, and composition of the particulate constituent produced to be included in the final composite.

Metallic particles produced through modulation-assisted machining include a narrow, controllable, range of shapes. For example, by varying the machining parameters, and potentially the cutting tool utilized, metallic particles can be selectively produced to include a fiber shape, a platelet shape, or an equiaxed shape.

Metallic particles produced utilizing modulation-assisted machining possess a unique microstructure. This microstructure differs from metallic particles produced through other processes of the prior art (e.g., via atomization or through reducing cutting shavings). The microstructure imparted into the particles during modulation-assisted machining is typically referred to as a nano-crystalline microstructure, which is an ultrafine grain microstructure.

It has been discovered that metallic particles formed through modulation-assisted machining have significantly greater strength relative metallic particles produced through other processes. This is due to the nano-crystalline microstructure imparted into the metallic particles during the modulation-assisted machining possess. The nano-crystalline structure imparted into the metallic particles during modulation-assisted machining provides increased strength relative to metal particles formed from the same material but where the particle is produced through other known processes. This increased strength can be highly advantageous for various applications, as will be described hereinafter.

FIG. 1 depicts a photograph 100 taken from a scanning electron microscope of metallic particles 102 formed utilizing modulation-assisted machining. These metallic particles 102 have an equiaxed morphology 108. The metallic particles 102 are referred to as equiaxed particles as the length 106, width 104, and height (not shown) dimensions are generally similar. It will be noted that the particles are not necessarily regularly shaped (e.g., as in being perfect cubes or rectangular cuboids), but rather have somewhat of an irregular shape due to the nature of the modulation-assisted machining cutting deformation process. These metallic particles 102 were formed from aluminum alloy 6061-T6 material 110.

Figures 1A, 1B:
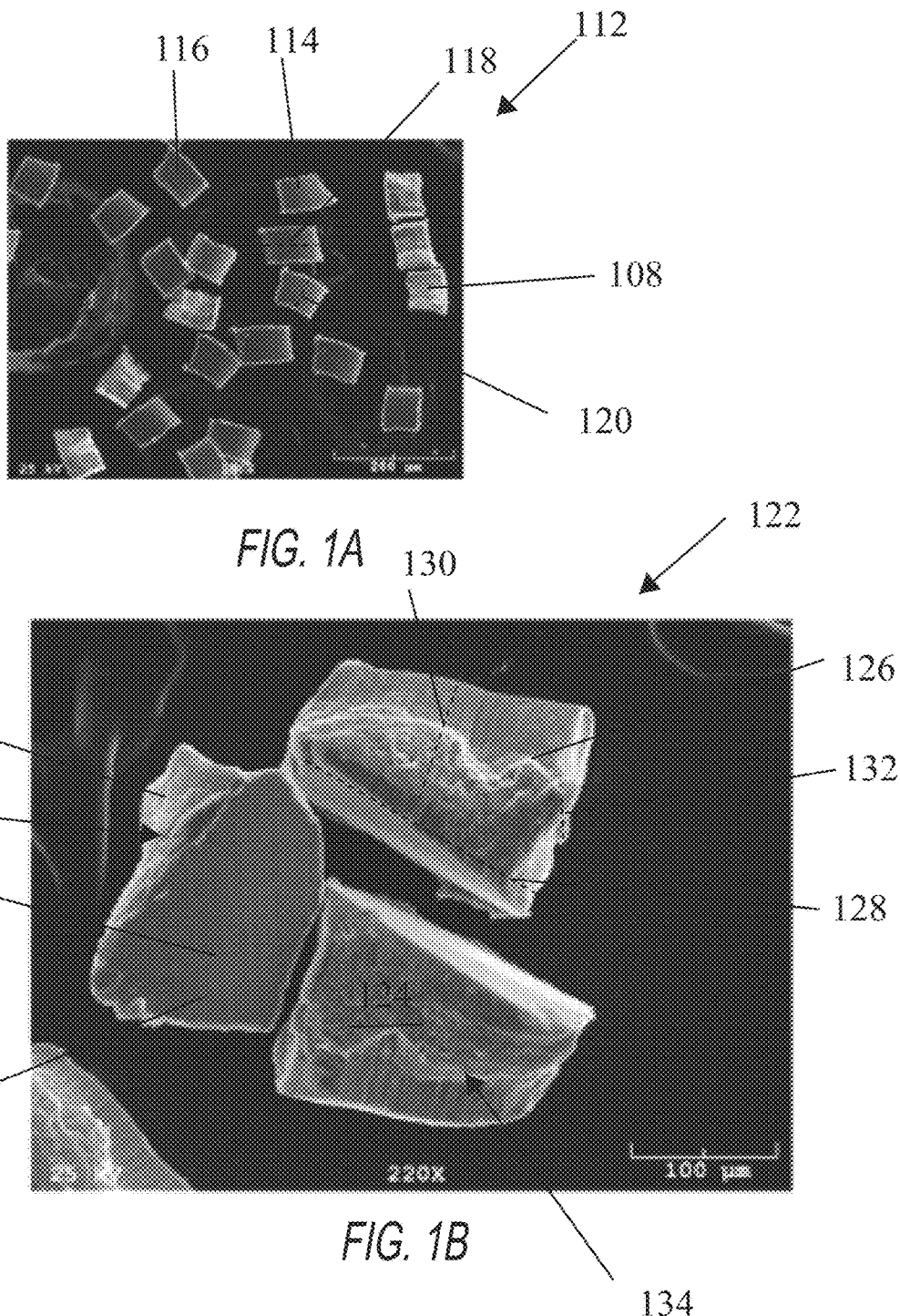

FIG. 1A depicts a photograph 112 of metallic particles 114, which were formed utilizing modulation-assisted machining. This photograph 112 was taken from a scanning electron microscope at 100× magnification. These metallic particles 114 have an equiaxed morphology 108 and are depicted a substantially cuboid shape in which the length 118, width 120, and height (not shown) are substantially the same. These metallic particles 114 were formed from aluminum alloy 6061-T6 material 116.

FIG. 1B depicts a photograph 122 of equiaxed metallic particles 124, which were also formed utilizing modulation-assisted machining. As was previously described, the modulation-assisted machining process utilized to form these metallic particles 124 imparts a unique nano-crystalline microstructure 134 into the metallic particles 124. This photograph 122 was taken from a scanning electron microscope at 220× magnification. These metallic particles 124 include an equiaxed morphology 108, in which the length 128, width 130, and height 132 are generally similar. These metallic particles 124 were formed from aluminum alloy 6061-T6 material 126.

Another unique aspect of metallic particles formed thorough modulation-assisted machining is that one side of the particles is typically "smooth", while the other sides of the particles include unique textural features and are not typically smooth. As is best illustrated in FIG. 1B, the metallic particles 124 each include a smooth surface 136, and textured surfaces 138. The smooth surface 136 is the surface of the particle 124 which was engaged by the cutting tool during machining.

As is illustrated, the unique textured features 140 can take the form of jagged ridges 140. It has been discovered that these unique textured features 140 on the textured surface 138 can be advantageous as they can aid in the binding/adhesion between the particles 124 and the matrix material when integrated into a composite.

Figure 2:
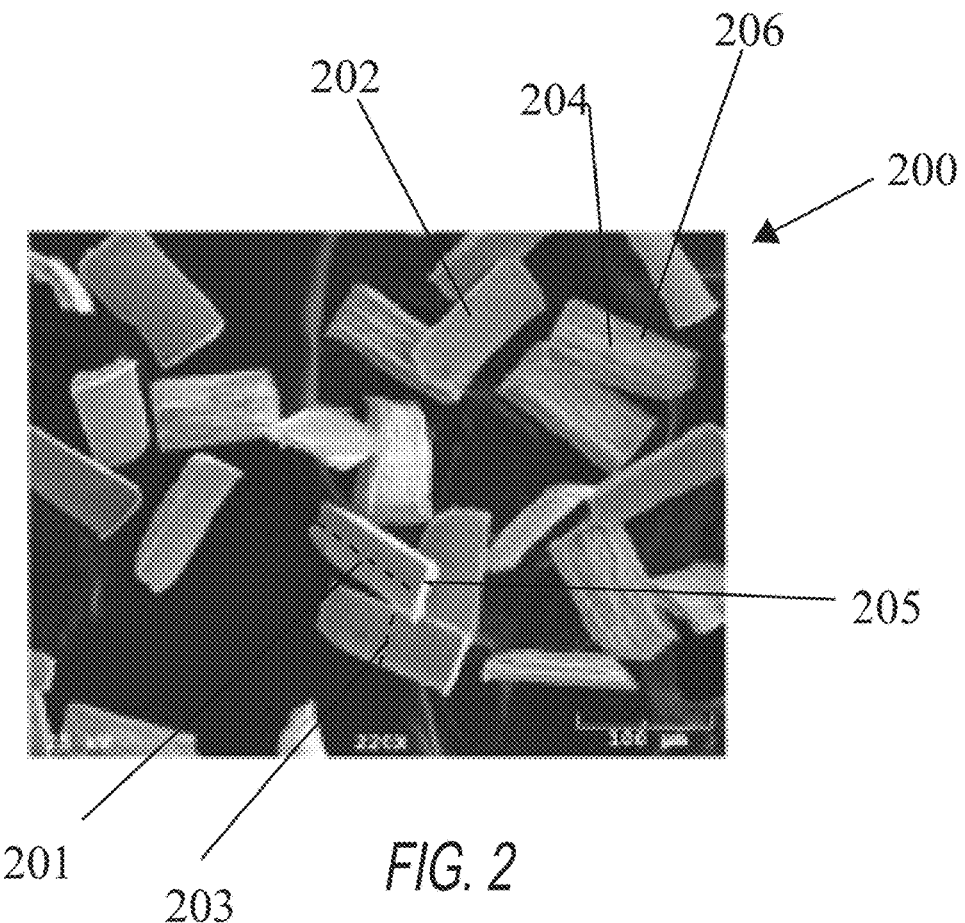
FIGS. 2 and 2A are photographic depictions of metallic particles formed through modulation-assisted machining, the metallic particles having a platelet configuration, as viewed from a scanning electron microscope.

FIG. 2 depicts a photograph 200 of metallic particles 202, which include a platelet morphology 204. These particles 202 were formed utilizing modulation-assisted machining. The photograph 200 was taken from a scanning electron microscope at 220× magnification. These metallic particles 202 are described as including a platelet morphology 204 as they include a length 201 and width 203 that is generally greater than their height dimension 205 (e.g., having a disk-like, or plate-like shape). These platelet shaped particles 202 were formed from aluminum alloy 6061-T6 material 206.

Figure 2A:
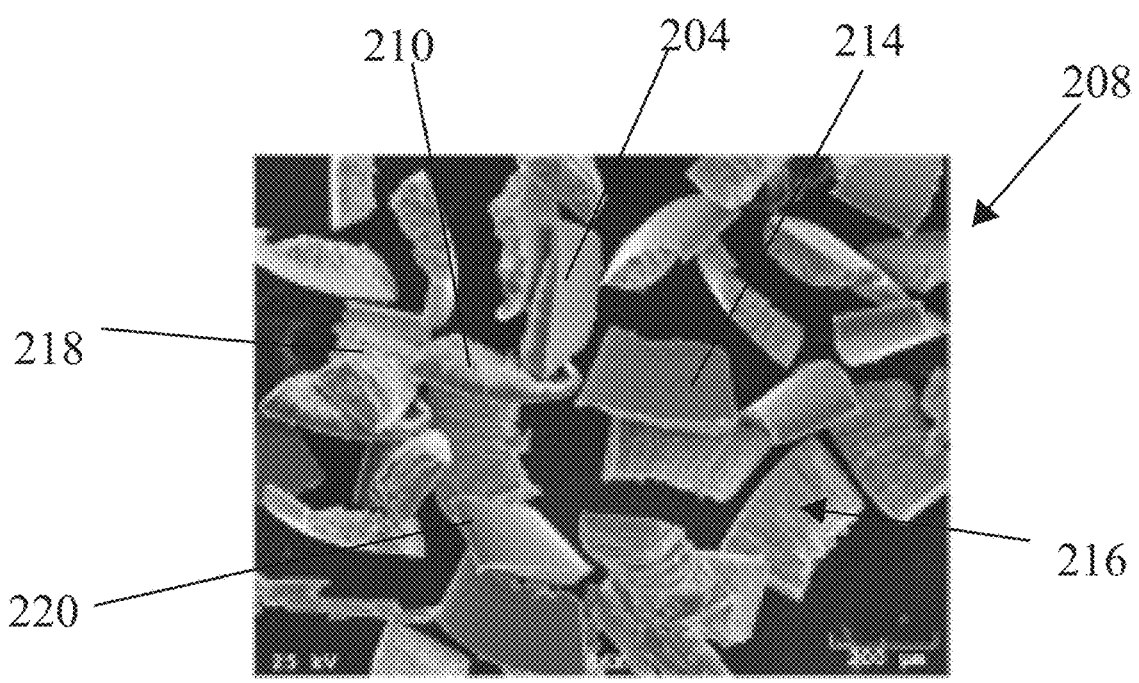

FIG. 2A depicts a photograph 208 of metallic particles 210, which also include a platelet morphology 204. The photograph 208 was taken from a scanning electron microscope at 220× magnification. These particles 210 include a nano-crystalline microstructure 216 imparted during the modulation-assisted machining process, as was previously described. Each particle 210 includes a substantially smooth surface 220 and rough, textured surfaces 218. These platelet shaped particles 210 were formed from aluminum alloy 6061-T6 material 214.

Figure 3:
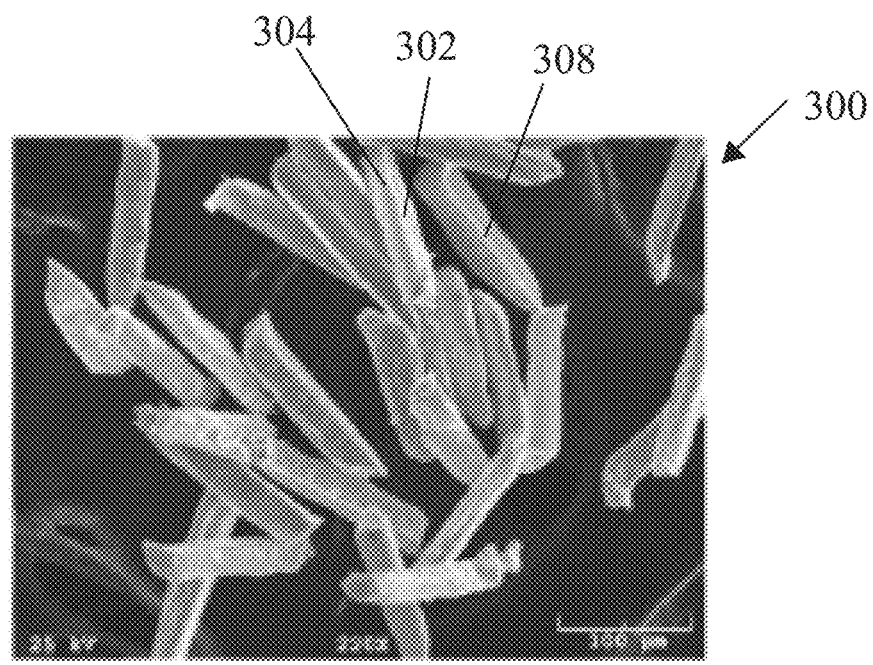
FIGS. 3 and 3A are photographic depictions of metallic particles formed through modulation-assisted machining, in which the metallic particles include a fiber configuration, as viewed from a scanning electron microscope.
Figure 3A:
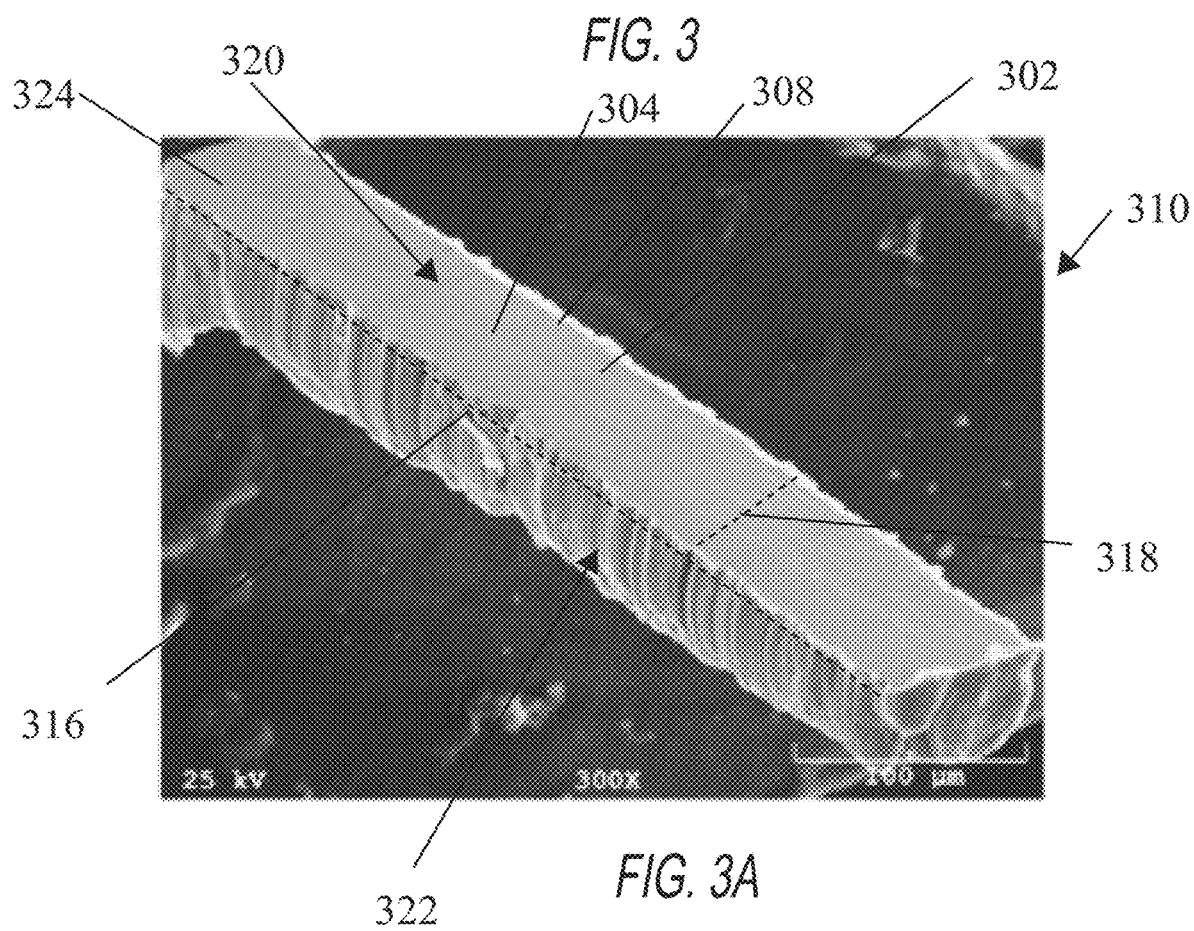

FIGS. 3 and 3A depict metallic particles 302, which include a fiber morphology 308. The photograph 300 was taken from a scanning electron microscope at 220× magnification and photograph 310 was taken at 300× magnification. These particulates 302 are described as having a fiber morphology 308 as they are generally needle-like in shape and have a length 316 that is significantly greater than the other dimensions (e.g., 318).

These fiber particles 302 are described as having a length 316 and an effective diameter 318. As utilized herein term "effective diameter" 318 is a measurement across a width of the fiber particle 302 which is substantially perpendicular to the length 316. This effective diameter 318 is utilized to account for the rough surface ridges 322 (e.g., similar to the effective diameter of a threaded bolt) and is utilized as the fiber particles 302 include a generally cylindrical shape yet a cross-section is not completely circular.

Each fiber particle 302 has a substantially smooth surface 324 and textured surfaces 322 resulting from machining, as has been described. These fiber particles 302 include a nano-crystalline microstructure 320 that is imparted during the modulation-assisted machining process, as was described herein. These fiber shaped particles 302 were formed from aluminum alloy 6061-T6 material 304.

Figure 5:
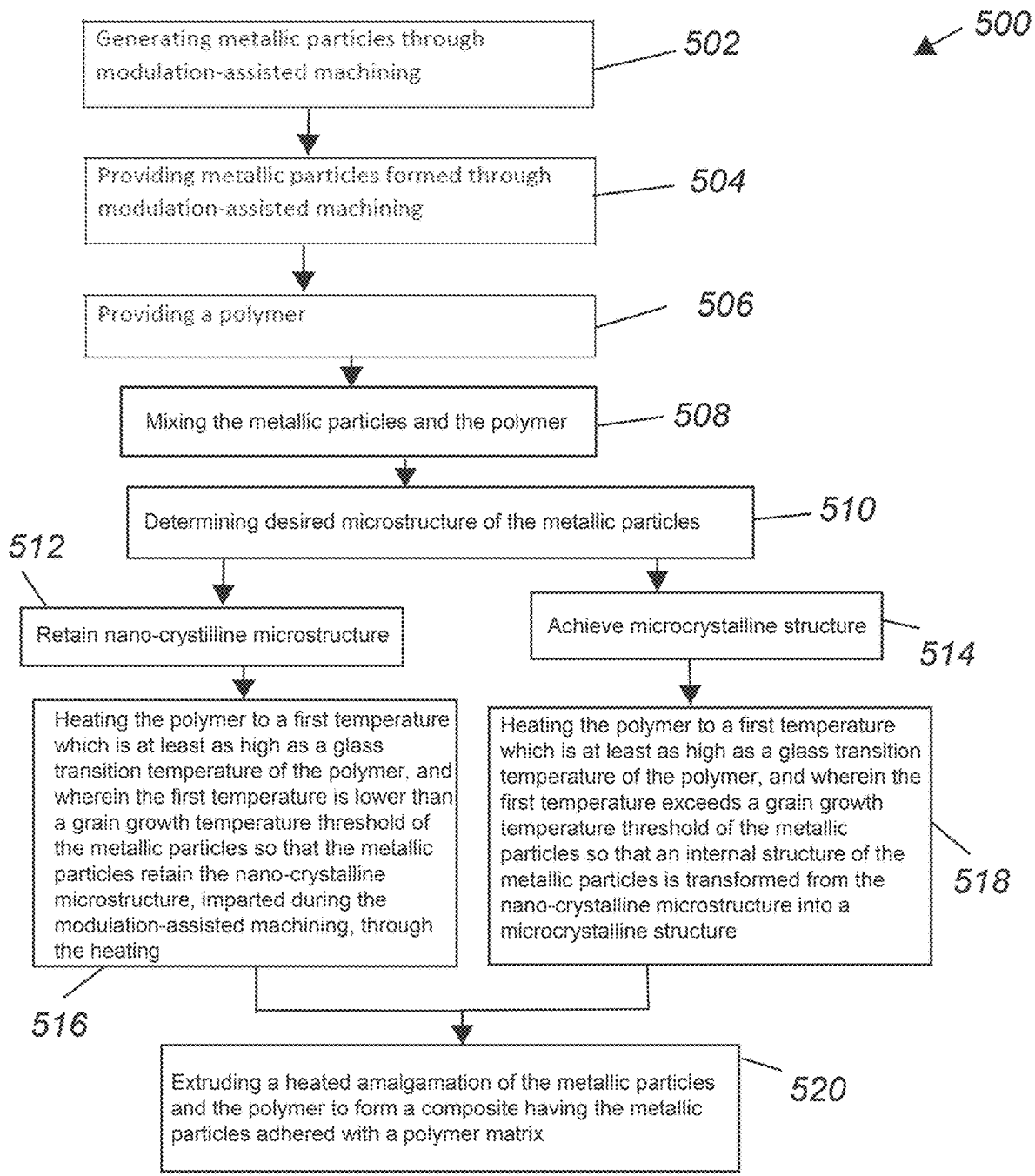
FIG. 5 depicts a flow chart for an exemplary method for producing a composite according to a first form of the present application.

Referring now to FIG. 5, an exemplary method 500 will now be described to form a composite. This composite includes metallic particles retained in a polymer matrix. At 502, the process describes generating metallic particles through modulation-assisted machining, as has been described herein. The modulation-assisted machining imparts a nano-crystalline microstructure into the metallic particles. The process describes providing metallic particles formed through modulation-assisted machining at 504.

These metallic particles can be equiaxed particles 102, 114, 124; platelet particles 202, 210; and/or fiber particles 302 as have been described; however, it is further contemplated that the metallic particles generated through modulation-assisted machining can include a number of desired morphological characteristics, depending upon the input parameters utilized during the machining operation, and can be formed from a variety of materials.

The metallic particles can be generated on-site, via modulation-assisted machining. This can occur as a continuous operation where the metallic particles are produced on demand during the composite forming process (e.g., the composite forming process can be an extrusion process, additive manufacturing process, or molding process). Alternatively, the metallic particles can be produced prior to the forming process. It is also contemplated that the metallic particles can be produced off-site and shipped to the production facility. In one non-limiting form, the metallic particles can be generated and provided as a composite feedstock having metallic particles in a thermoplastic polymer matrix, which is then utilized as the feedstock for the forming process. Such a composite feedstock will be described with regard to FIGS. 7 and 7A.

The metallic particles can be formed from a variety of metals and alloys. For example, the metallic particles can be formed of commercially pure aluminum, aluminum alloys, commercially pure copper, copper alloys, commercially pure nickel, nickel alloys, commercially pure titanium, titanium alloys, steel alloys, silver, gold, platinum, commercially pure tantalum, tantalum alloys, Inconel, or palladium. In some forms, metallic particles from two or more separate materials may be utilized in the same composite.

As will be understood to a person of skill, the metallic particles can be selected depending upon the specific characteristics desired in the final composite. For example, should a composite be desired for implantation into the human body, commercially pure titanium or Ti6Al4V may be considered as they possess excellent biocompatibility for use in implantable medical devices. It is contemplated that the metallic particles can be formed through modulation-assisted machining from any machinable metal or alloy.

Depending upon the specific application, and desired characteristics in the final composite, the metallic particles can include an equiaxed morphology 108, a platelet morphology 204, a fiber morphology 308, or a combination of these morphologies (e.g., some platelet particles and some fiber particles). However, it is also contemplated that the metallic particles can include any other morphology which may be produced through modulation-assisted machining.

It is believed that a fiber morphology 308 can be very beneficial for a variety of composite applications. For example, in additive manufacturing the inclusion of a fiber morphology 308 can allow a desired fiber orientation to be printed into the finished composite. Various fiber orientations can impart differing characteristics into the finished composite, as is known. For example, having the fiber orientation of alternating layers disposed at 90° relative one another can produce a very stiff composite, as is common in structural carbon fiber layups. Having the fiber orientation of all layers parallel can provide desirable flexural characteristics for certain applications.

As a non-limiting example of fiber dimensions, each metallic fiber can have a length ranging between 0.1 mm and 3.0 mm and each metallic fiber can include an effective diameter ranging between 0.01 mm and 0.25 mm. However, it is contemplated that the metallic particles and fibers may include any dimensions which can be produced via modulation-assisted machining.

As another non-limiting example of fiber dimensions, the metallic fibers can include a length ranging between 0.3 mm and 0.7 mm and an effective diameter ranging between 0.02 mm and 0.25 mm. It has been discovered that such fiber sizing smoothly flows through a standard sized printer nozzle. However, as will be appreciated to a person of skill, the dimensions of the specific nozzle to be utilized and well as the desired characteristics of the final composite should be considered when selecting the desired fiber sizing.

The process depicts providing a polymer at 506. The use of a wide variety of polymers is contemplated herein. Thermoplastic polymers and thermosetting polymers may be preferable for many applications. As would be understood to a person of skill, for applications where the composite will be utilized as a feedstock for further heating operations, such as additive manufacturing, use of a thermoplastic polymer is desirable in that thermoplastic polymers can be re-melted.

As with the metallic particles, the polymer can be selected based upon the desired characteristics of the final composite. As a non-limiting example, should the final composite be designed to be subjected to reasonably high temperatures (e.g., in the case of a brake pad as will be discussed hereinafter), it may be desirable to use poly ether ketone (PEEK) due to the high melting temperature thereof.

Exemplary thermoplastic polymers include: acrylonitrile butadiene styrene (ABS); nylon; PEEK; polymers in the polyethylene (PE) family, including high-density polyethylene (HDPE), medium-density polyethylene (MDPE), low-density polyethylene (LDPE); polyethylene terephthalate glycol (PETG); polycarbonate (PC); and thermoplastic polyurethane (TPU). However, the use of other thermoplastic polymers is contemplated herein.

The polymer can take the form of polymer pellets, as are commonly utilized in injection molding and extrusion processes. Additionally, the polymer can be provided in the form of a composite feedstock, which can also include the metallic particles, as is described with regard to FIGS. 7 and 7A.

In addition to the metallic particles and the polymer matrix, the composite can include a variety of additional additives and fillers to help achieve the characteristics desired in the finished composite. For example, it is contemplated that the composite can include a variety of coloring agents, clarifying agents, various fibers (e.g., carbon fibers, Kevlar, etc.) and fillers (e.g., ceramic fillers), as well as a variety of polymer additives as are commonly utilized to achieve desirable polymer characteristics during manufacture or in the final polymer matrix, such as plasticizers or additional co-polymers.

The metallic particles are mixed with the polymer at 508. The metallic particles can be pre-mixed with the polymer and provided as composite feedstock to be utilized for the forming process. The metallic particles can be mixed with polymer pellets prior to heating the mixture during the forming process. Alternatively, it is also contemplated that the polymer can be heated, and the metallic particles can be mixed into the heated polymer (e.g., in a screw extrusion system). In such a screw extrusion system, the metallic particles can be thoroughly mixed with the heated polymer in the screw.

The ratio of metallic particles to polymer matrix can vary significantly depending upon the application and the desired characteristics of the final composite. For example, when forming a frictional composite material, the volume fraction of metal fiber Vf can be as low as 1% or as high as 50%+. In one specific non-limiting form, a frictional composite material was produced which included a Vf of metallic fibers of 20% Vf. This frictional composite yielded an increase in micro-hardness of 20-30%, relative the base polymer. However, it is contemplated that the volume fraction VF of metal particles in the polymer matrix could range from as low as a few tenths of a percent to as high as ninety percent or more.

At 510, the desired microstructure of the metallic particles in the final composite is determined. As will be appreciated by a person of skill, the microstructure of the metallic particles may be determined, at least in part, upon the desired characteristics to be exhibited in the final composite. At 512, retaining the nano-crystalline microstructure imparted during the modulation-assisted machining is depicted. Achieving a microcrystalline structure within the metallic particles is depicted at 514.

In both alternative process steps 516 and 518, the process 500 describes heating the polymer to a temperature which is higher than a than a glass transition temperature of the polymer. As will be understood to a person of skill, the glass transition temperature of a polymer is a property which is dependent upon the specific polymer utilized. The glass transition temperatures of commonly utilized polymers, and maximum operating/processing temperatures for various polymer forming processes, are readily known in the art. It should also be appreciated that additives included in the polymer utilized can impact the glass transition temperature, melting temperature, and maximum operating temperature of the polymer or polymers, as is known.

As an example, PEEK has a higher glass transition temperature than many thermoplastic polymers. The glass transition temperature of PEEK is around 143° C. For most forming processes, the maximum operating temperature of PEEK is around 260° C. while the melting temperature of PEEK is around 343° C. When a polymer is heated to its glass transition temperature it begins to soften and becomes sticky. Once softened, the polymer can be formed into a variety of shapes through e.g., additive manufacturing, vacuum forming, injection molding, or other known forming processes. In this soft and sticky form, the polymer will adhere to the metallic particles produced by modulation assisted machining, especially the rough, textured surfaces of these particles. In this manner, when the polymer cools a unitary composite structure having metallic particles retained by a polymer matrix is formed.

In one exemplary, non-limiting form, it can be desirable to preserve the nano-crystalline microstructure of the metallic particles as is depicted at 512. As was previously described, this nano-crystalline microstructure is imparted into the metallic particles during the modulation-assisted machining. To preserve the nano-crystalline microstructure, the process describes that the first temperature is lower than a grain growth temperature threshold of the metallic particles at 516. In this manner, the nano-crystalline microstructure of the metallic particles is retained in the finished composite (e.g., the metallic particles are not subjected to a high enough temperature for a long enough time to result in grain growth; therefore, the nano-crystalline microstructure remains intact).

As will be appreciated by a person of skill, when metals are subjected to increasing temperatures over time, the internal structure of the metal(s) transitions through a recovery phase, then a re-crystallization phase, and finally a grain growth phase. These phases are not solely dependent upon temperature; rather, they are dependent upon both the temperature and time the metal is subjected to the temperature. The time/temperatures required for a specific metal or alloy to transition between these phases are known and are commonly available in tables or graphical form (e.g., depicting the temperature, and time required that a metal would need to be subjected to the temperature, for the specific phase/transition to occur).

As utilized herein, the terms "grain growth temperature" and "grain growth temperature threshold" include both the temperature and time at that temperature required to result in grain growth within the metallic particles. For example, a specific metal alloy may need to be maintained at 650° C. for thirty minutes for grain growth to occur, but grain growth may result if the same metal allow is subjected to 900° C. for seven minutes. The grain growth temperature/temperature threshold is dependent upon the composition (e.g., the specific metal or alloy makeup) and existing microstructure of the specific metallic particles utilized. For example, a commercial nickel alloy (e.g., Inconel 718) has a much higher grain growth temperature/temperature threshold than commercially pure aluminum.

The nano-crystalline microstructure imparted into the metallic particles during modulation-assisted machining can be preserved in the final composite by maintaining the temperature of the heating, and time the metallic particles are held at the temperature, below the grain growth temperature/threshold of the metallic particles as depicted at 516. If the metallic particles are not subjected to a high temperature for a long enough time to result in grain growth within the metal particles, the nano-crystalline microstructure of the metallic particles will remain intact. In some applications it may also be desirable to maintain the temperature, and time the particles are subjected to the temperature, below a re-crystallization threshold (e.g., such that re-crystallization will not occur within the metallic particles).

For applications where it is desired to retain the nano-crystalline microstructure of the metallic particles, the operating temperature of the polymer selected, and time the metallic particles will be at the operating temperature, may be considered as well as the grain growth temperature threshold of the metallic particles. In keeping the metallic particles below the grain growth threshold, the metallic particles will retain the nano-crystalline microstructure achieved during the modulation assisted machining.

As would be appreciated to a person of skill, the operating temperature (e.g., temperature to which the polymer and metallic particles are heated) will depend at least in part on the polymer selected and can also depend upon whether it is desired to retain the nano-crystalline microstructure of the metallic particles. In some specific non-limiting forms, the temperature the polymer is heated to can be lower than 300° C. and in some applications the temperature can be as low or lower than 200° C.; however, a wide variety of temperatures are contemplated herein.

Alternatively, it may be desirable to transform the nano-crystalline microstructure of the metallic particles to a microcrystalline structure as is depicted at 514. In this form, the recrystallization temperature threshold of the metallic particles is exceeded to intentionally cause the metallic particles to go through recovery and recrystallization. The grain growth temperature threshold of the metallic particles can be exceeded as is depicted at 518.

The nano-crystalline microstructure of the metallic particles can be transitioned to a microcrystalline structure by subjecting the metallic particles to a sufficiently high temperature for a long enough time to result in recrystallization and grain growth, if desired. When the temperature of the metallic particles, and the time the metallic particles are subjected to the temperature, exceeds the grain growth temperature threshold, the internal structure of the metallic particles transitions from the nano-crystalline microstructure into a microcrystalline structure. As will be appreciated to a person of skill, this microcrystalline structure is the typical microstructure of commercial metals and alloys.

An exemplary, non-limiting composite material in which the nano-crystalline microstructure is to be transformed to a microcrystalline structure will now be described. This composite includes metallic particles formed of pure gold adhered by a PEEK matrix. As the gold particles are formed through modulation assisted machining, a nano-crystalline microstructure is imparted into the gold particles. As was previously described, the maximum operating temperature of PEEK is around 260° C., and in this application, it may be desirable to heat the PEEK and gold particles to a temperature near the maximum operating temperature. The recrystallization temperature threshold of pure gold is somewhere between 150° C.-200° C., and grain growth begins between 200° C.-250° C. (e.g., during a typical processing time of several minutes).

In this example, as the PEEK and gold particles are heated toward 260° C., the grain growth temperature threshold of the gold particles is exceeded, and grain growth begins. As the gold particles transition through the recovery, recrystallization, and grain growth, the internal structure of the gold particles reverts from the nano-crystalline microstructure back to the microcrystalline structure.

At 520, the process describes extruding a heated amalgamation of the metallic particles and the polymer to form a composite having the metallic particles adhered with a polymer matrix.

The final composite can be formed through additive manufacturing, e.g., 3-D printing. The extruding described at step 520 can include extruding the amalgamation of metallic particles and polymer through a printer nozzle. Advantageously, when metallic fibers are utilized, the printer nozzle can be directed along a preset printing path to obtain a desired metallic fiber orientation.

Figure 6:
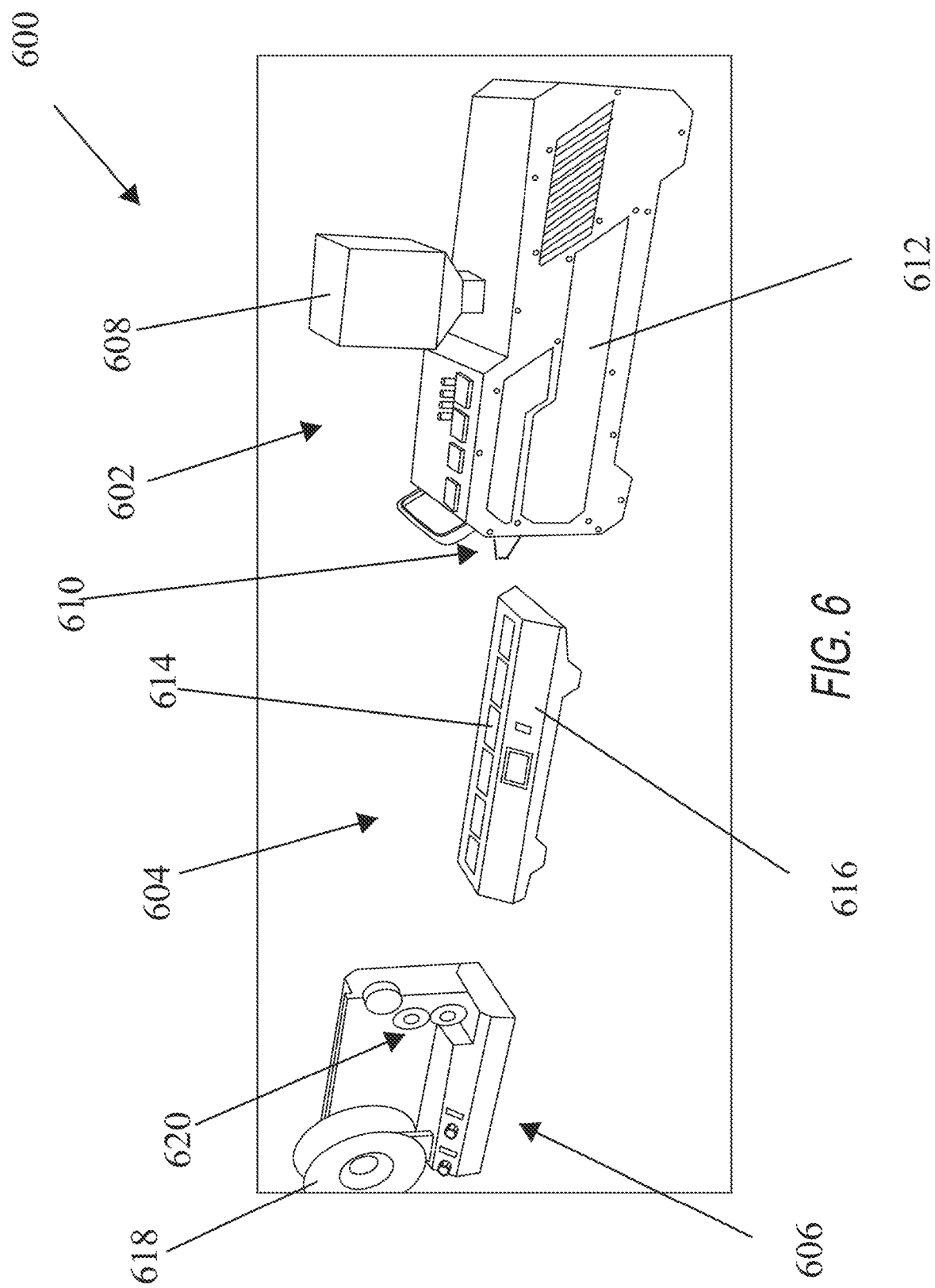
FIG. 6 depicts an exemplary lab scale screw extruder system which can be utilized to produce a composite feedstock for additive manufacturing.

FIG. 6 shows an exemplary lab scale extrusion system 600. This system 600 was utilized to form composites according to the teachings of the present application. This extrusion system 600 includes a heated screw extruder 602, a convection cooling device 604, and a filament winder 606.

The extruder 602 is depicted as a Filabot EX6 extruder 602. A material hopper 608 is depicted as housing mixed metallic particles and polymer pellets. However, it is also contemplated that two separate hoppers may be utilized (e.g., one hopper for metallic particles and one hopper 608 for polymer pellets). Internal to the housing 612 of the extruder 602 is a three-stage screw extrusion system, and multi-zone heating elements/temperature control system. This extruder 602 heats the polymer pellets, mixes the metallic particles and heated/molten polymer pellets, and the screw extrusion system forces the heated amalgamation of metallic particles and heated/molten polymer out of the nozzle 610. As is known, the nozzle 610 diameter and shape will impact the diameter and shape of the extruded composite filament.

A convection cooling device 604 can be utilized to assist in cooling the extruded composite filament. This convection cooling device 604 is depicted as being a Filabot Airpath cooling device 604. Internal to the housing 616 is a fan which blows air upwardly through openings 614. The extruded composite filament is held above the openings 614 as it passes between the nozzle 610 and the winder 606. In this manner, air is passed over the composite filament which cools the composite filament so that the composite filament does not stick together when wound on the winder 606.

The filament winder 606 is depicted as being a Filabot Winder 606. This winder 606 includes a spool 618 onto which the composite filament will be wound. The puller wheels 620 pull the extruded composite filament and varying the speed of the puller wheels 620 can be utilized to fine tune the diameter of the extruded composite filament.

This lab scale extrusion system 600 produced an extruded composite filament which worked well as a feedstock for additive manufacturing; however, the small scale (e.g., the lab scale nature) of the system has significant limitations. It is contemplated that a variety of extrusion systems may be utilized to form composites in accordance with the teachings of the present application. In addition to extrusion processes, it is also contemplated that composites having a polymer matrix and modulation-assisted machined particles can be formed through injection molding, vacuum forming, and additional additive manufacturing processes.

Figure 7:
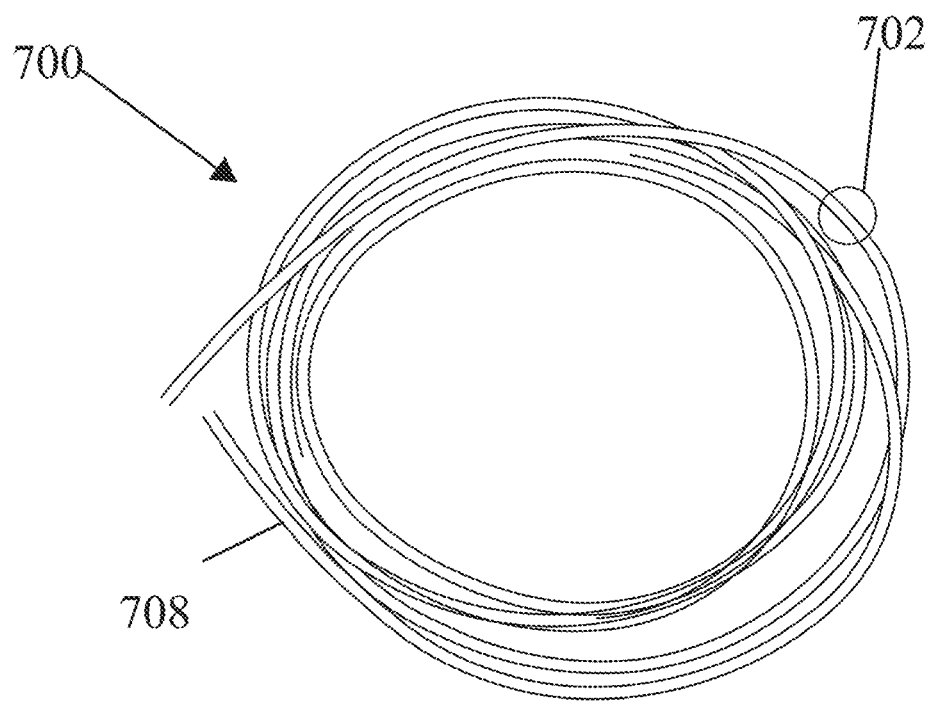
FIG. 7 depicts an exemplary extruded composite feedstock manufactured with the lab scale extruder of FIG. 6.
Figure 7A:
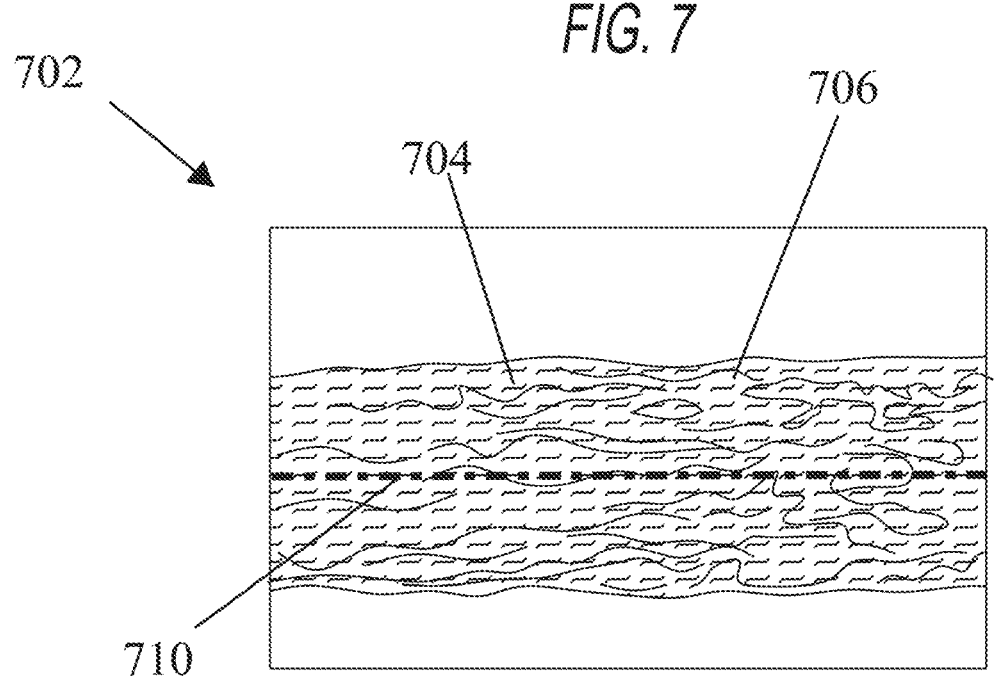
FIG. 7A depicts a close-up view of the extruded composite feedstock of FIG. 7.

FIGS. 7 and 7A depict an extruded composite filament 700 which was produced utilizing the lab scale extrusion system 600. FIG. 7A depicts a close-up view of the filament 700, as viewed at 702. This exemplary, non-limiting composite filament 700 includes a nylon matrix 706 and five percent by volume (e.g., Vf) of aluminum 6061-T6 modulation-assisted machined fibers 704. As is illustrated, a lengthwise axis of the metallic fibers 704 tends to extend along a lengthwise axis 710 of the extruded composite filament 700.

This composite filament 700 can be utilized as a feedstock 708, also referred to as feed material 708, for further processing such as additive manufacturing or injection molding. Advantageously, when the composite filament 700 is utilized as feedstock 708 for fused deposition modeling (which is a form of additive manufacturing) the general alignment of the lengthwise axis of the metallic fibers 704 (e.g., the fiber orientation) in the resulting composite product will generally follow the printing path of the printing nozzle. For certain applications, the ability to direct the metallic fiber 704 orientation can be highly advantageous and can impart various desired characteristics into the finished composite. The advantages of fiber orientation selection are presently known with regard to various composites, such as carbon fiber strand orientation in layups.

Figure 8:
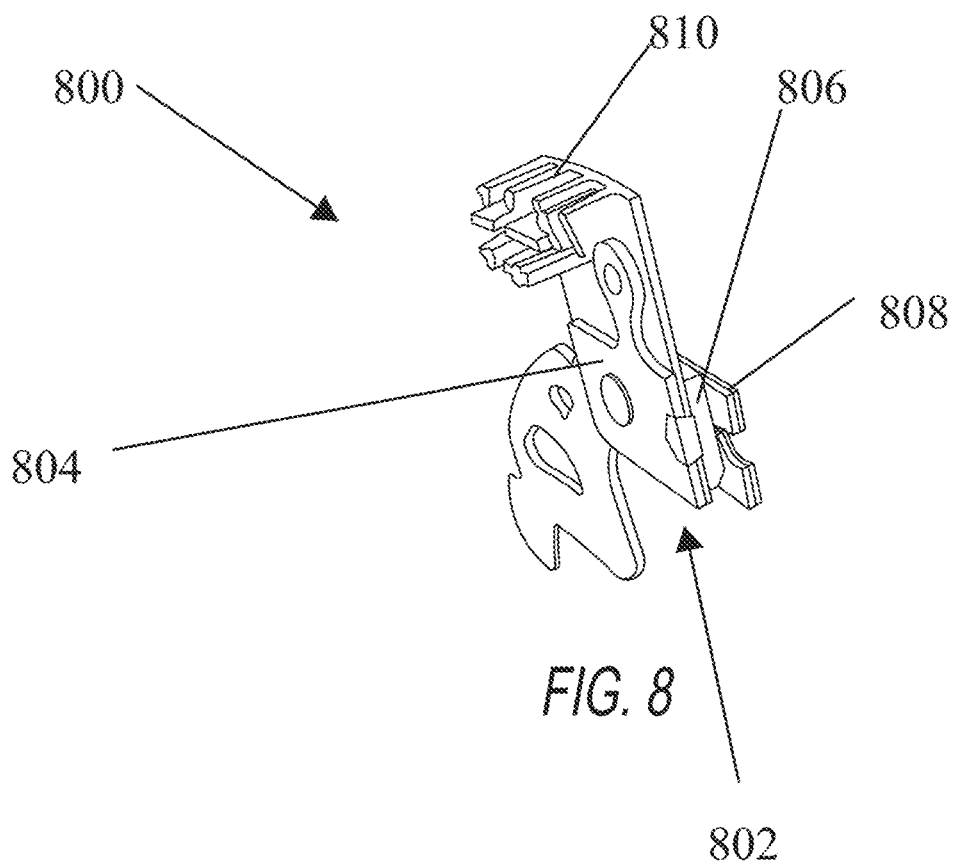
FIG. 8 is a partial perspective view of a bicycle braking system, having a composite brake pad formed according to the present application.

FIG. 8 is a partial view of a bicycle braking assembly 800, which includes a composite brake pad 806 formed according to the teachings of the present application. The brake assembly depicted in FIG. 8 is a partial view of a brake assembly manufactured by Shimano, a noted bicycle component manufacturer; however, similar braking assemblies are manufactured by Sram, Kool Step, Alritz, Hotop, Hyacinth, LSSH GMbH, Aniki, as well as other manufacturers.

The bicycle braking assembly 800 includes a brake rotor 808 which is attached to and rotates with the bicycle wheel (not shown). The brake rotor 808 rotates between two opposing brake pads (only left side frictional composite brake pad 806 is illustrated). The left side brake pad 806 and the right-side brake pad (not shown) are functional coupled to a braking caliper (not shown), and each pad includes a substantially flat frictional face 903 (left side brake pad) which is oriented toward opposing substantially flat faces of the rotor. The braking caliper and brake pads are maintained in a fixed position (e.g., do not rotate).

Prior to braking, the braking pads are maintained in a "spread apart" configuration and the frictional faces of the braking pads do not firmly contact the rotor faces. During braking, the braking caliper exerts a force on the brake pads which forces the frictional face 903 of brake pad 806, and the frictional face of the opposing right side brake pad (not shown), against the opposing faces of the rotor 808 thereby frictionally engaging the opposing faces of the rotor disc 808. This frictional engagement between the pads and the rotor 808 causes the rotational speed of the rotor disc 808 to slow down, and ultimately stop. As the rotor disc 808 is fixedly coupled to the wheel, the wheel stops when the movement of the rotor disc 808 stops. As is understood, such frictional engagement can result in significant heat generation, hence the inclusion of cooling fins 810 onto the brake assembly 800.

Figure 9:
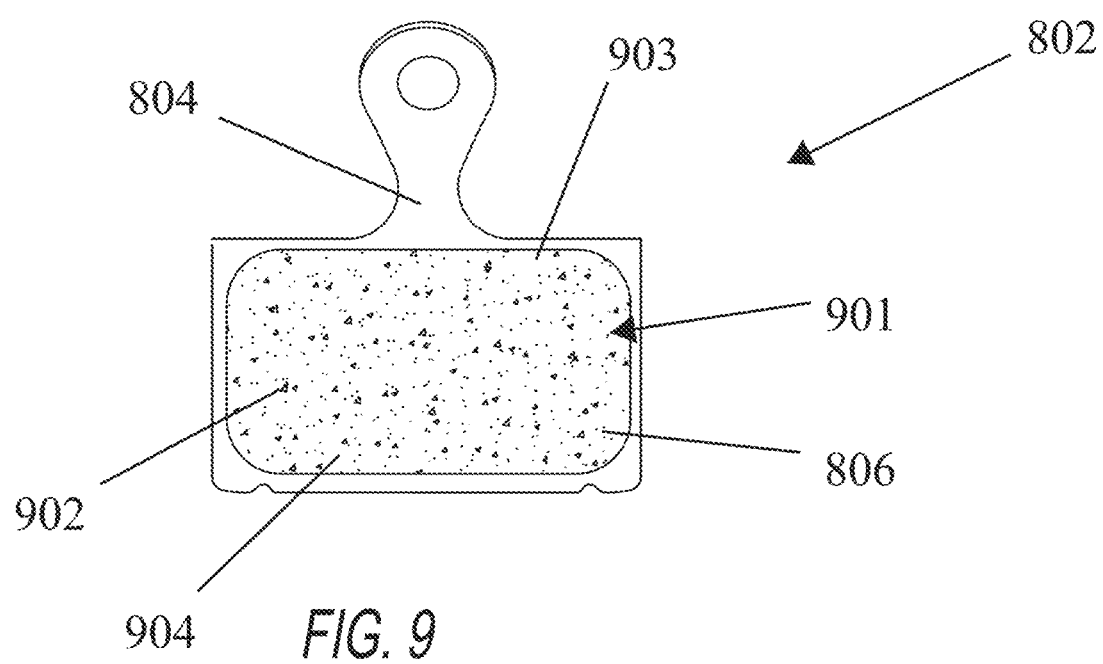
FIG. 9 is a front view of the brake pad of FIG. 8, which depicts metallic particles retained in a polymer matrix.

FIG. 9 depicts the brake pad assembly 802 of FIG. 8, which can be referred to as a brake carrier 802, removed from the braking assembly 800. The brake carrier 802 includes a backing member 804, and a composite frictional brake pad 806. The frictional face 903 is configured to frictionally engage with the rotor 808, as was previously described.

The composite frictional brake pad 806 includes a composite construction 901. This composite frictional brake pad 806 includes metallic particles 902, which are produced through modulation-assisted machining, and a polymer matrix 904. The metallic particles 902 can include a nano-crystalline microstructure as has been described herein. In one non-limiting form, the polymer matrix 904 is a thermoplastic polymer matrix 904, the metallic particles 902 are aluminum alloy metallic fibers 902, and the composite frictional brake pad 806 was formed through fused deposition modeling.

The inclusion of metallic particles 902 having a nano-crystalline microstructure into the composite frictional brake pad 806 has shown to increase wear resistance, and thereby provide a longer life than bicycle brake pads of the prior art. Additionally, the nano-crystalline microstructure of metallic particles 902 may also reduce the braking "noise" and improve breaking performance in conditions where water and/or moisture is present.

Figure 10:
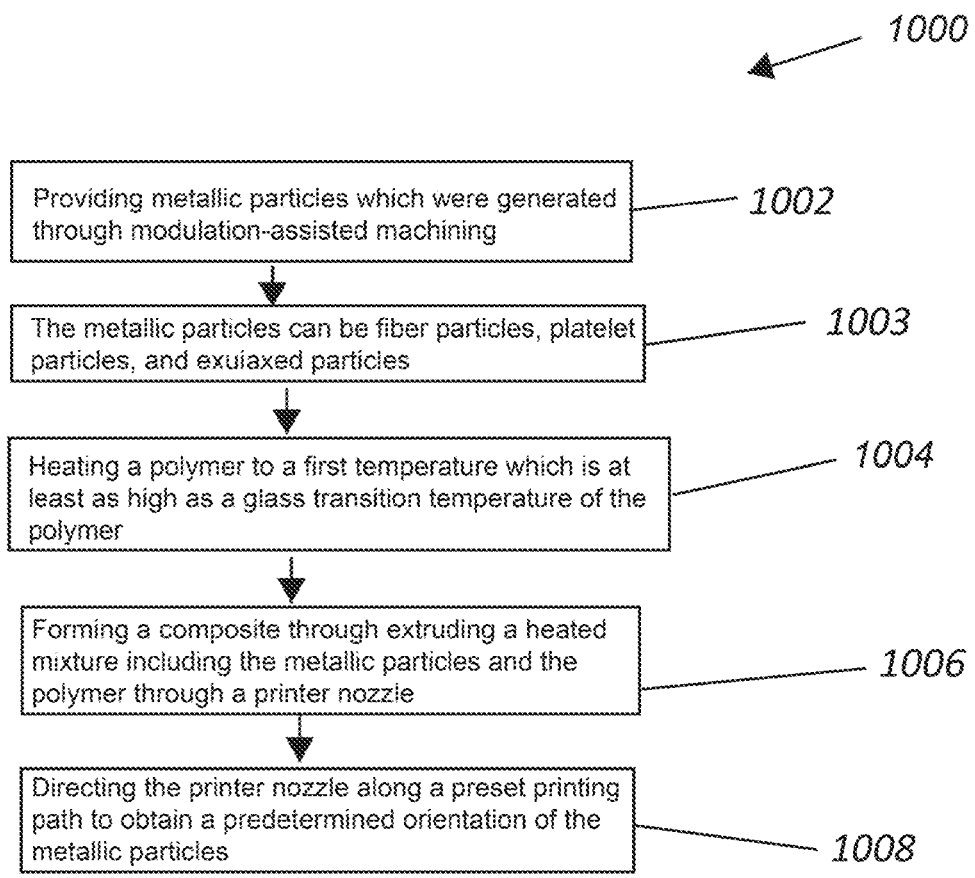
FIG. 10 depicts a flow chart for an exemplary process for producing a composite through fused deposition modeling.

Referring now to FIG. 10, an exemplary process 1000 of producing a composite utilizing fused deposition modeling will now be described in connection with producing the composite frictional brake pad 806 as was described in FIGS. 8-9. The process describes providing metallic particles 902 which were generated through modulation-assisted machining at 1002. It is contemplated that the metallic particles 902 can be generated on-site, via modulation-assisted machining, just prior to the fused deposition modeling process. The metallic particles 902 can be produced off-site and shipped to the production facility. The modulation-assisted machining can impart a nano-crystalline microstructure into the metallic particles.

In one non-limiting form, providing metallic particles 902 as depicted at 1002 can include providing a composite feedstock having the metallic particles 902 disposed in a polymer matrix 904. Use of a composite feedstock is believed to overcome many of the storage and safety issues with metal particulates/powders present in the prior art. Specifically, having the metallic particles 902 disposed in a polymer matrix 904 (e.g., as a composite feedstock) would reduce the likelihood of that the metallic particles 902 would corrode and would prevent the inhalation of the metallic particles 902.

As is depicted at 1003, the metallic particles 902 can be fiber particles, platelet particles, or equiaxed particles. The metallic particles 902 can include multiple particle morphologies (e.g., fiber and equiaxed, platelet and fiber, etc.). In one non-limiting form, the metallic particles 902 can be aluminum metallic fibers 902; however, a variety of metallic particles 902 can be utilized depending upon the specific characteristics desired in the final composite 901, as has been previously described herein.

At 1004, the polymer 904 is heated to a first temperature which is at least as high as a glass transition temperature of the polymer 904. As was previously described with regard to FIG. 5, the glass transition temperature of the polymer 904 is dependent upon the specific polymer 904 selected.

In one non-limiting form, the polymer 904 can be nylon. However, it is contemplated that polymer 904 could take the form of a variety of thermoplastic polymers 904, depending on the desired characteristics of final composite 901. The polymer 904 can take the form of polymer pellets. Additional polymer constituents and additives may be added to the polymer 904, or to the feedstock. For example, a polyethylene terephthalate glycol polymer additive may be included, or additional fibers may be included (e.g., carbon fiber fillers, nylon fiber fillers, etc.).

Should a nano-crystalline microstructure be desired in the metallic particles, the first temperature should be lower than a grain growth temperature threshold of the metallic particles 902 The nano-crystalline microstructure within the metallic particles 902 is preserved in the final composite structure by maintaining the metallic particles 902 below the grain growth temperature threshold. Specifically, the metallic particles 902 are not subjected to a high enough temperature, for a long enough time, to result in grain growth.

If a microcrystalline structure is desired in the metallic particles, the first temperature can be higher than the recrystallization temperature threshold and can be higher than the grain growth temperature threshold. As has been described, if the metallic particles 902 are subjected to a sufficiently high temperature for a sufficiently long period of time (e.g., the grain growth temperature threshold is exceeded) the internal structure of the metallic particles 902 will transition from the nano-crystalline microstructure, which was imparted during the modulation-assisted machining, back to a microcrystalline structure.

At 1006, the method describes forming a composite through extruding a heated mixture including the metallic particles 902 and the polymer 904 through a printer nozzle. In this fused deposition modeling process 1000, which is a form of additive manufacturing, the heated feedstock (including the metallic particles 902 and the polymer 904) is output through a printer nozzle. The printer nozzle is typically controlled via a computer controller, which directs the printer nozzle to form the desired composite 902 shape. Layer-upon-layer of the heated feedstock is deposited from the printer nozzle such that the desired structure, in this case the composite brake pad 806, is produced which can include the size and shape shown in FIGS. 8 and 9.

Advantageously, with 3-D printing the printer nozzle can be directed along a preset path to obtain a desired metallic fiber 902 orientation as is described at 1008.

The composite brake pad 806 may then attached to an existing carrier 804. The attachment of the composite brake pad 806 to the existing carrier 804 can be achieved with a bonding agent such as adhesive; however, it is also contemplated that the composite brake pad 806 could be directly printed and bonded directly to the carrier 804 if appropriate retention areas were present on the carrier 804 (e.g., if the carrier 804 included sufficient gripping surfaces or gripping protrusions for the composite 901 to adhere to).

The composite brake pad 806 does not require any post processing heat treatments as were required with many forming processes of the prior art.

While the production process 1000 was described with regard to production of the composite brake pad 806, this production process 1000 can be utilized to produce a variety of composites such as frictional materials, structural materials, electrically conductive materials, or other composite materials. For example, composites produced according to the methods herein could be electrically conductive (e.g., due to the metallic particles/fibers embedded within the matrix) and could be utilized as electro-magnetic shielding (EMS) materials.

In addition to brake pads, another exemplary frictional composite which can be produced utilizing processes 500 and 1000 is a skateboard wheel. It has been discovered that TPU matrix-based wheels having metallic particles formed through modulated-assisted machining provide enhanced wear characteristics and last longer than skateboard wheels of the prior art.

Composites produced utilizing the teachings described herein can include many advantages. For example, early data has shown an increase in elastic modulus when metallic fibers are included in polymer matrix which is very promising for structural applications in which only elastic deformation is present.

Figure 4A:
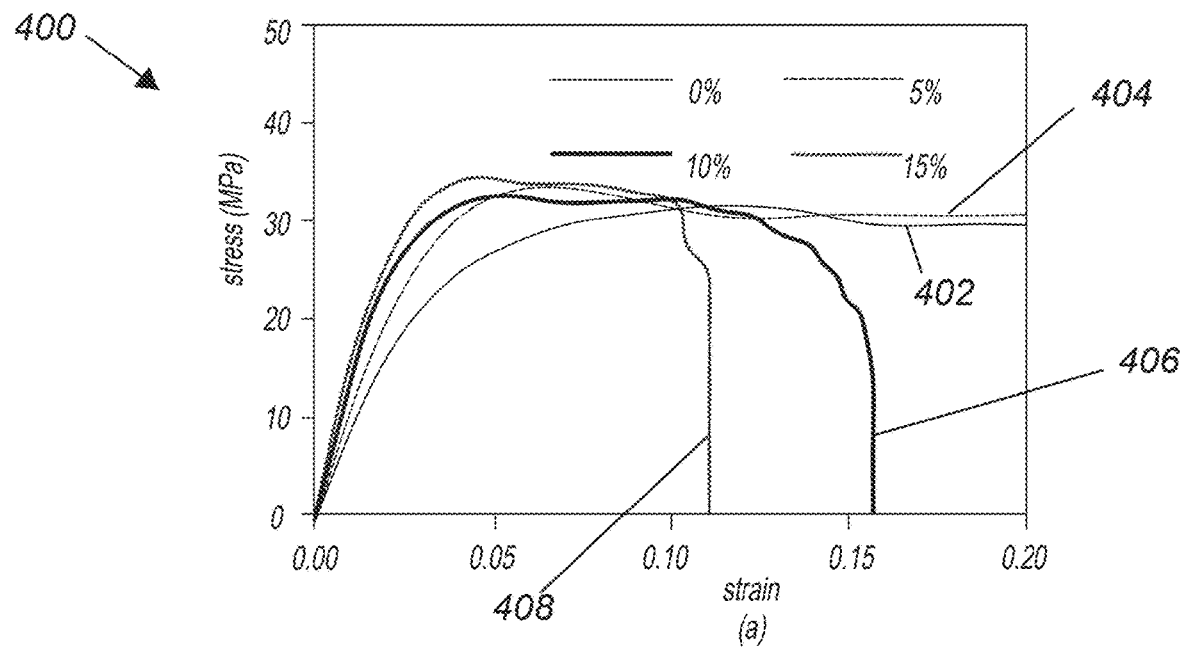
FIG. 4A is a graphical representation of stress-strain behavior for an extruded composite having metallic fibers (e.g., 0% metallic fibers, 5% metallic fibers, 10% metallic fibers, and 15% metallic fibers) and a nylon polymer matrix.

FIG. 4A is a graphical representation 400 of stress-strain behavior for an extruded composite formed according to the teachings of the present application. 402 depicts a baseline stress-strain behavior for a nylon matrix including 0% metallic fibers. 404 depicts the stress-strain behavior for a composite including 5% metallic fibers in a nylon matrix. 406 depicts the stress-strain behavior for a composite including 10% metallic fibers in a nylon matrix, and 408 depicts the stress-strain behavior for a composite including 15% metallic fibers retained and nylon matrix.

Figure 4B:
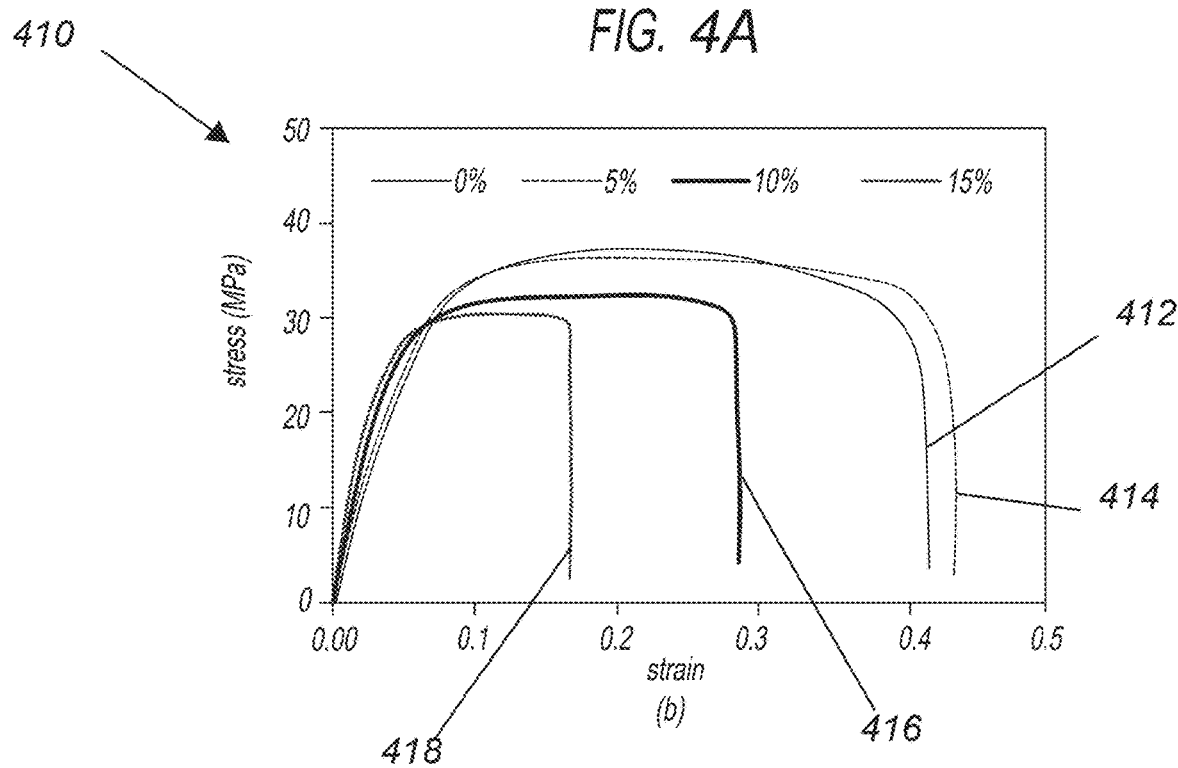
FIG. 4B is a graphical representation of stress-strain behavior for a composite formed through fused deposition modeling, in which the composite includes metallic fibers (e.g., 0% metallic fibers, 5% metallic fibers, 10% metallic fibers, and 15% metallic fibers) and a nylon matrix.

FIG. 4B is a graphical representation 410 of stress-strain behavior for a composite formed through fused deposition modeling according to the teachings of the present application. 412 depicts a baseline stress-strain behavior for a nylon matrix including 0% metallic fibers. 414 depicts the stress-strain behavior for a composite including 5% metallic fibers in a nylon matrix. 416 depicts the stress-strain behavior for a composite including 10% metallic fibers in a nylon matrix. 418 depicts the stress-strain behavior for a composite including 15% metallic fibers retained and nylon matrix.

The extruded composites formed showed approximately 20 to 30 percent increase in elastic modulus, and similar increases in ultimate tensile strength when compared to the base nylon thermoplastic. Although the fused deposition modeling tensile test specimens did not show the same improvements as the extruded composite filaments, it is believed that this was due to voids present within the 3-D printed composites resulting from printing conditions. It is believed that the conditions which led to voids in the 3-D printed composite can be easily corrected to achieve equivalent results to the extrusion.

Micro-hardness testing showed a linearly increasing hardness which is an indication of strength and wear resistance, with increasing fiber content. A 70 percent increase in hardness was observed for a 15 percent by weight aluminum fiber composite produced. These preliminary mechanical property tests suggested that potential performance enhancements may be realized. Physical properties of the composites, such as tensile strength, compression strength, bending strength, and/or shear strength have been shown to be enhanced with composites of the present application. Other physical properties of the composites, such as thermal properties, magnetic properties, and electrically conductive characteristics may show significant improvement when compared to the prior art. It is also believed that other mechanical behaviors such as wear resistance, creep resistance, fatigue resistance, and toughness can be improved or modified with composites manufactured according to the teachings herein.

Additionally, the metal particulates can substantially change various physical properties of the matrix material, including but not limited to thermal properties such as thermal conductivity, thermal expansion, melting point, or heat capacity; electrical properties such as conductivity, resistance or magnetism, or other physical properties that may relate to features such as color or optical transparency.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for forming a composite, comprising:
   providing a plurality of metallic particles formed through modulation-assisted machining;
   providing a polymer;
   mixing the metallic particles with the polymer to create an amalgamation of the metallic particles and the polymer;
   heating the amalgamation of metallic particles and the polymer to a first temperature, wherein the first temperature is at least as high as a glass transition temperature of the polymer; and
   extruding the heated amalgamation of metallic particles and the polymer to form the composite having the metallic particles adhered with a polymer matrix;
   wherein the plurality of metallic particles each includes a textured surface that enhances adhesion of the metallic particles and the polymer matrix;
   wherein the modulation-assisted machining imparts a nano-crystalline microstructure into the plurality of metallic particles, and wherein the first temperature exceeds a grain growth temperature threshold of the metallic particles, whereby an internal structure of the metallic particles is transformed from the nano-crystalline microstructure into a microcrystalline microstructure.

2. The method of claim 1, wherein the plurality of metallic particles is selected from the group consisting of fiber particles, platelet particles, and equiaxed particles.

3. The method of claim 1, wherein the modulation-assisted machining imparts a nano-crystalline microstructure into the plurality of metallic particles, and wherein the first temperature is lower than a grain growth temperature threshold of the metallic particles so that the metallic particles retain the nano-crystalline microstructure through the heating.

4. The method of claim 3, wherein the first temperature is lower than a critical recrystallization temperature threshold of the metallic particles.

5. The method of claim 1, wherein providing the polymer further comprises providing thermoplastic polymer pellets, and wherein mixing the metallic particles with the polymer further comprises mixing the thermoplastic polymer pellets and the metallic particles prior to heating the thermoplastic polymer.

6. The method of claim 5, further comprising the step of reheating the composite for further processing, wherein the further processing is selected from the group consisting of additive manufacturing, thermoforming, and injection molding.

7. The method of claim 6, further comprising generating the metallic particles through modulation-assisted machining, wherein the metallic particles are machined from at least one of the following metals and alloys: aluminum, copper, titanium, nickel, magnesium, lithium, platinum, scandium, tungsten, molybdenum, niobium, tantalum, rhenium, palladium, and steel.

8. The method of claim 1, wherein providing the plurality of metallic particles further comprises providing a plurality of metallic fibers, wherein each metallic fiber includes a length ranging between 0.1 mm and 10.0 mm, and wherein each metallic fiber includes an effective diameter ranging between 0.01 mm and 0.25 mm.

9. A method for forming a composite through fused deposition modeling, comprising:
Providing metallic particles, wherein the metallic particles were generated through modulation-assisted machining, wherein the metallic particles each include a textured surface that enhances the adhesion of the metallic particles and a polymer;
Heating the polymer to a first temperature which is at least as high as a glass transition temperature of the polymer; and
Forming the composite through extruding a heated mixture including the metallic particles and the polymer through a printer nozzle;
wherein the modulation-assisted machining imparts a nano-crystalline microstructure into the plurality of metallic particles, and wherein the first temperature exceeds a grain growth temperature threshold of the metallic particles, whereby an internal structure of the metallic particles is transformed from the nano-crystalline microstructure into a microcrystalline microstructure.

10. The method of claim 9, wherein the metallic particles are selected from the group consisting of fiber particles, platelet particles, and equiaxed particles.

11. The method of claim 10, wherein the modulation-assisted machining imparts a nano-crystalline microstructure into the metallic particles, and wherein the first temperature is lower than a grain growth temperature threshold of the metallic particles so that the nano-crystalline microstructure is retained.

12. The method of claim 9, wherein providing metallic particles further comprises providing metallic fibers in a composite feedstock, wherein heating the polymer further comprises heating the composite feedstock, and further comprising directing the printer nozzle along a preset printing path to obtain a predetermined orientation of the metallic fibers.

13. A method for forming a composite, comprising:
providing a plurality of metallic particles formed through modulated, assisted machining which imparts a nano-crystalline microstructure into the plurality of metallic particles;
providing a polymer having a glass transition temperature;
mixing the metallic particles with the polymer to create an amalgamation of the polymer with the metallic particles;
heating the amalgamation of the polymer with the metallic particles to at least the glass transition temperature of the polymer; and
extruding the heated amalgamation of the polymer with the metallic particles to form the composite having the metallic particles adhered with a polymer matrix;
wherein the plurality of metallic particles each includes a textured surface that enhances adhesion of the metallic particles and the polymeric matrix;
wherein the modulation-assisted machining imparts a nano-crystalline microstructure into the plurality of metallic particles, and wherein the first temperature exceeds a grain growth temperature threshold of the metallic particles, whereby an internal structure of the metallic particles is transformed from the nano-crystalline microstructure into a microcrystalline microstructure.

14. The method of claim 13, wherein the metallic particles are selected from the group consisting of fiber particles, platelet particles, and equiaxed particles.

15. The method of claim 14, wherein the amalgamation of the polymer with the metallic particles is heated to a temperature above the glass transition temperature that is less than a critical temperature that would lead to grain growth of the microstructure in the metallic particles whereby an internal structure of the metallic particles is transformed from the nano-crystalline microstructure into a microcrystalline microstructure.

16. The method of claim 15, wherein providing metallic particles further comprises providing metallic fibers in a composite feedstock, wherein heating the polymer further comprises heating the composite feedstock, and further comprising directing a printer nozzle along a preset printing path to obtain a predetermined orientation of the metallic fibers.

17. The method of claim 15, wherein the amalgamation of the polymer with the metallic particles is heated to a temperature at or at the melting temperature of the polymer.

18. The method of claim 15, wherein the amalgamation of the polymer with the metallic particles is heated to a temperature at the melting temperature of the polymer.

* * * * *